3,320,332
PROCESS FOR CONVERTING 1,2,3,4 - TETRAHYDRONAPHTHALENE TO OCTAHYDROANTHRACENE AND OCTAHYDROPHENANTHRENE
Abraham Schneider, Overbrook Hills, Pa., assignor to Sun Oil Company, Philadelphia, Pa., a corporation of New Jersey
No Drawing. Filed Oct. 5, 1964, Ser. No. 401,663
10 Claims. (Cl. 260—668)

This invention is a method of forming sym-octahydroanthracene, herein OHA, and sym-octahydrophenanthrene, herein OHP, by the disproportionation of 1,2,3,4-tetrahydronaphthalene utilizing as catalyst an aluminum halide - 1,2,3,4 - tetrahydronaphthalene - hydrogen halide complex. Use of this catalyst results in surprising and unexpected benefits not obtainable when the catalyst is an aluminum halide per se.

It is known that in the presence of anhydrous $AlCl_3$ 1,2,3,4-tetrahydronaphthalene disproportionates to form a variety of products including OHA and OHP. The usual method of conducting the reaction involves adding the $AlCl_3$ to 1,2,3,4-tetrahydronaphthalene and stirring the resulting slurry for the desired reaction time. The reaction is normally ended when the rate of OHA-OHP formation becomes uneconomically slow and this point is normally prior to the time at which the catalyst becomes deactivated. Hence if the catalyst could be separated it could be used to disproportionate additional 1,2,3,4-tetrahydronaphthalene but in most cases the only practical means of doing this is to quench the entire reaction product mixture in an aqueous medium such as dilute HCl. This results in a dilute HCl solution of hydrated $AlCl_3$ and an organic phase immiscible therewith which contains the various reaction products and any unreacted 1,2,3,4-tetrahydronaphthalene. The organic phase is decanted and the various components thereof separated by, e.g., distillation.

The main disadvantage of this technique is that the quenching step employed results in the conversion of the catalytic anhydrous $AlCl_3$ to hydrated $AlCl_3$ which has no catalytic activity. In other words, although the quenching step facilitates the recovering of organics it also destroys the catalyst at a time when the catalyst is not deactivated. This is, of course, obviously undesirable.

It has now been found that if an $AlCl_3$ liquid complex containing $AlCl_3$, 1,2,3,4-tetrahydronaphthalene, and HCl is used as catalyst instead of $AlCl_3$ unexpected advantages are realized. Upon contacting 1,2,3,4-tetrahydronaphthalene with the $AlCl_3$ complex the 1,2,3,4-tetrahydronaphthalene disproportionates to OHA and OHP, as in the case where $AlCl_3$ is used, but the reaction product mixture contains two liquid phases. One phase is an organic phase and contains unreacted 1,2,3,4-tetrahydronaphthalene, OHA, OHP, and some by-products. Most importantly, this phase is free of catalyst. The other phase is a catalyst phase and contains the $AlCl_3$ complex. Since the organic phase is distinct from the catalyst phase the former can be separated from the catalyst phase without destroying the latter by, e.g., decanting. From the separated organic phase OHA, OHP, and unreacted 1,2,3,4-tetrahydronaphthalene can be separated by, say, distillation and the unreacted 1,2,3,4-tetrahydronaphthalene again contacted with the $AlCl_3$ complex previously used. One advantage of being able to recover the organics without destroying the catalyst is that the catalyst can be reused and the yield of product per unit of catalyst is thereby increased. Another is that the 1,2,3,4-tetrahydronaphthalene disproportionation process becomes readily adaptable to continuous operation. It has also been found that the use of an $AlBr_3$-1,2,3,4-tetrahydronaphthalene-HBr complex as catalyst yields the same unexpected benefits described above for the $AlCl_3$ complex.

Although aluminum halide-hydrocarbon-hydrogen halide complexes per se are not new the advantages resulting from the use of an aluminum halide-1,2,3,4-tetrahydronaphthalene-hydrogen halide complex as the catalyst for the disproportionation of 1,2,3,4-tetrahydronaphthalene to OHA and OHP are surprising and unexpected for the following reasons. As mentioned, the reaction product mixture which results is a two-phase system, one phase containing the aluminum halide complex and the other phase being an organic phase containing OHA, OHP, unreacted 1,2,3,4-tetrahydronaphthalene, and some high molecular weight by-products. Since OHA and OHP are more basic than 1,2,3,4-tetrahydronaphthalene it would be expected that they would form a complex with the acidic aluminum halide and hydrogen halide and thus drive the 1,2,3,4-tetrahydronaphthalene into the organic layer. In other words, in the presence of both OHA and OHP and 1,2,3,4-tetrahydronaphthalene one would expect the acidic aluminum halide to complex with the more basic OHA and OHP rather than the less basic 1,2,3,4-tetrahydronaphthalene. If this happened the desired products would be in the catalyst phase and could not then be separated without destroying the catalyst. Surprisingly, the OHA and OHP are found in the organic phase. In other words, in the presence of OHA, OHP, and excess 1,2,3,4-tetrahydronaphthalene the aluminum halide and hydrogen halide complex with 1,2,3,4-tetrahydronaphthalene in preference to OHA and OHP. Since in the present process the conversion of 1,2,3,4-tetrahydronaphthalene is relatively low (the total yield of OHA, and OHP, by far the major products, is usually about 5–30%) there is always a substantial amount of 1,2,3,4-tetrahydronaphthalene available. Some of the 1,2,3,4-tetrahydronaphthalene complexes with the aluminum halide-hydrogen halide while the remainder, along with OHA and OHP and some by-products, forms the organic phase. Stated in another manner, the presence of 1,2,3,4-tetrahydronaphthalene in the organic phase insures that OHA and OHP are washed out of the catalyst phase.

According to the invention 1,2,3,4-tetrahydronaphthalene is disporportionated to OHA and OHP by contacting the 1,2,3,4-tetrahydronaphthalene at a temperature in the range of 0°–120° C. with an aluminum halide-1,2,3,4-tetrahydronaphthalene-hydrogen halide complex. The aluminum halide can be $AlCl_3$ or $AlBr_3$ and the halide in the hydrogen halide is the same as that in the aluminum halide. Upon such contacting two liquid phases result, an upper organic phase containing OHA, OHP, and unreacted 1,2,3,4-tetrahydronaphthalene and a lower catalyst phase. The two phases are separated and OHA and OHP recovered from the organic phase. Preferably the unreacted 1,2,3,4-tetrahydronaphthalene is also recovered from the organic phase and is then contacted with the separated catalyst in order to form additional OHA and OHP. In the subsequent description of the invention it will be assumed that the aluminum halide is $AlCl_3$.

The catalyst can be preformed and then contacted with 1,2,3,4-tetrahydronaphthalene or can be formed in situ in excess 1,2,3,4-tetrahydronaphthalene with disproportionation of the latter occurring essentially simultaneously with the formation of the complex. The latter technique is preferred.

The catalyst is preformed by dissolving or suspending the $AlCl_3$ in 1,2,3,4-tetrahydronaphthalene and then passing HCl into the mixture. This can be done at room temperature but the use of an elevated temperature of, say, 50°–100° C. generally is desirable to increase the rate of the reaction involved in formation of the complex. The amount of 1,2,3,4-tetrahydronaphthalene employed should be about 5 moles per mole of $AlCl_3$. Formation of the complex is evidenced by the conversion of the AlCl₃-1,2,3,4-tetrahydronaphthalene-HCl mixture into a mobile liquid having an orange to yellow color. The complex is a relatively stable material having high catalytic activity.

The preformed complex is then contacted with 1,2,3,4-tetrahydronaphthalene at 0°–120° C., preferably at 25°–80° C. in a reaction vessel equipped with means for intimately mixing the 1,2,3,4-tetrahydronaphthalene and catalyst. In order to prevent loss of HCl from the complex and a resulting loss of catalytic activity the reaction is preferably carried out under an atmosphere of HCl. Preferably the HCl partial pressure is 1–50 p.s.i.a. with the higher pressures being used in conjunction with higher reaction temperatures, although pressures as high as 100–500 p.s.i.a. can also be used. After the desired contact time, discussed more fully hereinafter, the reaction product mixture is settled and the organic layer separated by, e.g., decanting. The amount of OHA and OHP in the organic phase will depend mainly upon the amount of catalyst and the reaction time. Normally the amount of catalyst will be 1–40%, preferably 3–30%, as AlCl₃, based on the total weight of 1,2,3,4-tetrahydronaphthalene, i.e., the uncomplexed 1,2,3,4-tetrahydronaphthalene to be disproportionated plus the 1,2,3,4-tetrahydronaphthalene used to form the complex, and the reaction time will normally be about 5 minutes to 4 hours, usually 15–90 minutes. All percentages herein are by weight. Within these ranges the total yield of OHA and OHP based on 1,2,3,4-tetrahydronaphthalene and a theoretical reaction of 2 moles 1,2,3,4-tetrahydronaphthalene yielding 1 mole of either OHA or OHP will usually be about 5–30% with the yield increasing as the amount of catalyst and the reaction time increase. For example, the data in Table 1 below show the total yield of OHA and OHP at different reaction times and different amounts of catalyst, the latter being as AlCl₃ and by weight of the 1,2,3,4-tetrahydronaphthalene. The data in Table 1 is obtained in the manner described in Example 1 infra.

TABLE 1

| Amount of Catalyst, percent | Reaction Time (minutes) | | | | | |
|---|---|---|---|---|---|---|
| | 15 | 30 | 45 | 60 | 90 | 120 |
| 5 | 0.5 | 1.2 | 2.5 | 4.0 | 4.5 | 5.0 |
| 5 | 8.2 | 11.5 | 16.8 | 20.5 | 24.8 | 26.1 |
| 10 | 11.3 | 21.2 | 24.8 | 29.1 | 32.6 | 33.4 |

It is apparent from the data contained in Table 1 above that both the reaction time and catalyst concentration influence the yield of product. There are, however, certain factors which should be considered in selecting the reaction time and amount of catalyst. As explained previously and in more detail hereinafter one advantage of the use of an AlCl₃ complex as catalyst is that OHA-OHP product can be recovered without destroying the catalyst and that the latter can therefore be reused. In other words a single quantity of catalyst can be used to disproportionate several quantities of 1,2,3,4-tetrahydronaphthalene. It is apparent from the data in Table 1 that the rate of OHA and OHP formation is considerably higher in the first 60 minutes of the reaction than after 60 minutes reaction. In fact the yield of OHA and OHP at reaction times longer than about 90 minutes is not significantly greater than the yield at 90 minutes. It is therefore preferable to employ a relatively low reaction time of about 5–60 minutes, more preferably 5–30 minutes, with any unreacted 1,2,3,4-tetrahydronaphthalene being recycled, i.e., being subsequently separated and again contacted with the catalyst. Although the yield decreases as the reaction time decreases this is offset by the increased reaction rate.

An even more important reason for operating at a relatively low reaction time is to improve the catalyst life. As the reaction time increases the amount of high molecular weight by-products increases and it is believed that some of these by-products are actually formed from OHA and OHP. The high molecular weight by-products tend to poison, i.e., deactivate the catalyst, hence it is desirable to employ low reaction times in order to reduce the formation of these poisons and thereby maximize catalyst life. In other words a low reaction time of about 5–60 minutes, preferably 5–30 minutes, results in a "cleaner" reaction and a lower catalyst consumption.

A final reason for employing a relatively low reaction time is to insure the presence of a large amount of unreacted 1,2,3,4-tetrahydronaphthalene. As pointed out previously the presence of the OHA and OHP products as a phase distinct from and therefore separable from the catalyst phase is dependent upon having a large amount of 1,2,3,4-tetrahydronaphthalene present. The relative amount of 1,2,3,4-tetrahydronaphthalene present increases as the reaction time decreases.

From the separated organic lever OHA, OHP, and unreacted 1,2,3,4-tetrahydronaphthalene are separated by any convenient procedure, e.g., vacuum distillation. Since OHA and OHP boil quite close together it is usually most convenient to distill off a 1,2,3,4-tetrahydronaphthalene fraction and then distill off a mixture of OHA and OHP. OHA is separated from this mixture by fractional crystallization at room temperature and is then further purified by recrystallization from methanol.

The catalyst phase remaining after separation of the organic phase can be used to effect the disproportionation of additional 1,2,3,4-tetrahydronaphthalene. Preferably the unreacted 1,2,3,4-tetrahydronaphthalene previously recovered is mixed with sufficient additional fresh 1,2,3,4-tetrahydronaphthalene to yield the desired 1,2,3,4-tetrahydronaphthalene:catalyst ratio and this mixture is then contacted in the manner described above with the catalyst previously used. After the desired reaction time product recovery can be made in the manner described previously. A number of 1,2,3,4-tetrahydronaphthalene disproportionations can be conducted with a single batch of catalyst but eventually the catalyst loses its activity and must be replaced. The total amount of OHA and OHP that can be obtained from a given quantity of catalyst is usually about 8–9 grams per gram of catalyst as AlCl₃. In conducting a series of disproportionations a small amount of catalyst is preferably replaced with fresh catalyst at periodic intervals in order to maintain the catalyst activity at a constant level.

Another and preferred method of carrying out the disproportionation reaction involves forming the catalyst in situ in excess 1,2,3,4-tetrahydronaphthalene, i.e., in the presence of more 1,2,3,4-tetrahydronaphthalene than is required to form the AlCl₃ complex. Since the formation of the complex involves about 5 moles 1,2,3,4-tetrahydronaphthalene per mole of AlCl₃ the tetralin:AlCl₃ ratio will be at least 5:1 and will usually be at least 10:1. Since the catalyst concentration will be at least 1%, the 1,2,3,4-tetrahydronaphthalene:AlCl₃ ratio will not exceed 100:1 and will usually not exceed about 33.3:1 (3% AlCl₃). In this embodiment of the invention AlCl₃ and excess 1,2,3,4-tetrahydronaphthalene are charged to the reaction vessel which is preferably maintained in an atmosphere of HCl. These components are then mixed for a few minutes to allow formation of the complex after which the procedure is the same as described previously. Disproportionation of the excess 1,2,3,4-tetrahydronaphthalene occurs essentially simultaneously with formation of the complex. After subsequent separation of the organic and catalyst layers, OHA, OHP, and unreacted 1,2,3,4-tetrahydronaphthalene are separated from the former. The catalystt is used again to disproportionate an additional batch of 1,2,3,4-tetrahydronaphthalene, the latter preferably including the unreacted 1,2,3,4-tetrahydronaphthalene previously recovered. If it is desired to maintain the catalyst activity at a substantially constant level a portion of the catalyst is purged and replaced by adding an equivalent amount of $AlCl_3$ to the next batch of 1,2,3,4-tetrahydronaphthalene disportionated.

In a commercial operation it will generally be more economical to operate in a continuous manner and this is the preferred manner of practicing the invention. In such a process 1,2,3,4-tetrahydronaphthalene, both fresh 1,2,3,4-tetrahydronaphthalene and recycle 1,2,3,4-tetrahydronaphthene, is continuusly charged to a reaction vessel maintained under, e.g., 15 p.s.i.a. HCl pressure. Simultaneously therewith fresh $AlCl_3$ and recycle $AlCl_3$ complex is continuously charged to the vessel, the total amount of $AlCl_3$, i.e., the fresh $AlCl_3$ plus the $AlCl_3$ content of the complex, being, e.g., 5% of the total 1,2,3,4-tetrahydronaphthalene. A portion of the reaction product is continuously withdrawn and passed to a separator where the reaction product is allowed to settle and the resulting two phases separated. A portion of the catalyst phase is purged and the remainder is continuously recycled to the reaction vessel as said recycle catalyst. The separated organic phase is continuously distilled to separate 1,2,3,4-tetrahydronaphthalene, OHA, and OHP, and the 1,2,3,4-tetrahydronaphthalene is continuously recycled to the reaction vessel as said recycle 1,2,3,4-tetrahydronaphthalene.

The following examples specifically illustrate the invention.

*Example 1*

A mixture of 200 grams 1,2,3,4-tetrahydronaphthalene and 20 grams $AlCl_3$ are charged to a glass reaction vessel maintained at 65° C. after which HCl is bubbled through the mixture until the HCl partial pressure in the vessel is 14.7 p.s.i.a. Within a few minutes a bright orange-yellow complex phase forms. Stirring is continued for 15 minutes at the end of which time the stirring is stopped, the complex layer is allowed to settle to the bottom of the flask and the upper organic layer is decanted and analyzed to determine the OHA-OHP content thereof.

Next this procedure is repeated 5 times except that reaction times of 30, 45, 60, 90, and 120 minutes are used instead of 15 minutes. Finally this same series of 6 runs is repeated twice more except that in one case the catalyst concentration is 5% and 0.5% in the other. The data in Table 1 supra show the total yield based on 1,2,3,4-tetrahydronaphthalene of OHA and OHP recovered from the organic phase in each run. The data contained in Table 2 below show, for the runs employing 5% and 10% catalyst, the yield of OHA and OHP expressed as grams per gram of $AlCl_3$.

TABLE 2

| Reaction Time | Grams OHA-OHP per Gram of $AlCl_3$ | |
| --- | --- | --- |
| | 5% $AlCl_3$ | 10% $AlCl_3$ |
| 15 | 1.16 | 0.80 |
| 30 | 1.62 | 1.49 |
| 45 | 2.37 | 1.75 |
| 60 | 2.90 | 2.05 |
| 90 | 3.50 | 2.30 |
| 120 | 3.68 | 2.34 |

*Example 2*

The procedure is the same as in Example 1 using a 15-minute reaction time and a catalyst concentration of 10% except that after the organic phase is decanted at the end of the 15-minute reaction period it is replaced with a volume of 1,2,3,4-tetrahydronaphthalene equal to the volume of organic phase decanted. The catalyst phase and the fresh 1,2,3,4-tetrahydronaphthalene charge is then stirred for 15 minutes after which the organic layer is again decanted and replaced with fresh 1,2,3,4-tetrahydronaphthalene. This procedure is repeated until 225 minutes have elapsed. In other words the entire run is 225 minutes with the organic layer being removed and replaced by an equal volume of fresh 1,2,3,4-tetrahydronaphthalene every 15 minutes. Each of the 15 organic layers removed in this manner is analyzed for OHA and OHP. The amount of product obtained therefrom expressed as grams per gram of $AlCl_3$ is as shown in Table 3 below along with the amount of 1,2,3,4-tetrahydronaphthalene added every 15 minutes.

TABLE 3

| Time | Organic Layer Removed | Volume 1,2,3,4-Tetrahydronaphthalene Added-mls. | OHA-OHP Recovered from Organic Layer as Grams per Gram $AlCl_3$ | |
| --- | --- | --- | --- | --- |
| | | | Individual Amount | Cumulative Amount |
| 0 | | 200 | | |
| 15 | 1 | 112 | 0.70 | 0.70 |
| 30 | 2 | 105 | 0.68 | 1.38 |
| 45 | 3 | 95 | 0.66 | 2.04 |
| 60 | 4 | 82 | 0.60 | 2.64 |
| 75 | 5 | 92 | 0.75 | 3.39 |
| 90 | 6 | 93 | 0.65 | 4.04 |
| 105 | 7 | 82 | 0.60 | 4.64 |
| 120 | 8 | 68 | 0.60 | 5.24 |
| 135 | 9 | 118 | 0.73 | 5.97 |
| 150 | 10 | 115 | 0.58 | 6.55 |
| 165 | 11 | 120 | 0.48 | 7.03 |
| 180 | 12 | 116 | 0.39 | 7.42 |
| 195 | 13 | 116 | 0.40 | 7.82 |
| 210 | 14 | 126 | 0.30 | 8.12 |
| 225 | 15 | 0 | 0.31 | 8.43 |

It is apparent from the data contained in Table 3, in conjunction with the data shown in Table 2, that removal of the organic phase followed by reuse of the catalyst phase distinctly increases the amount of product that can be obtained per unit of $AlCl_3$. This is possible, of course, only because the OHA-OHP product can be recovered from the entire reaction product mixture without destroying the catalyst. In Example 2 the yield of OHA-OHP is 14.6% based on 1,2,3,4-tetrahydronaphthalene.

*Example 3*

The procedure is the same as in Example 2 except that 10 grams $AlCl_3$ are used, the organic phase is decanted and replaced with an equal volume of 1,2,3,4-tetrahydronaphthalene every 30 minutes instead of every 15 minutes, and the run is carried out for an elapsed time of 210 minutes instead of 225 minutes. The results are as shown in Table 4 below.

TABLE 4

| Time | Organic Layer Removed | Volume 1,2,3,4-Tetrahydronaphthalene Added-mls. | OHA-OHP Recovered from Organic Layer as Grams per Gram $AlCl_3$ | |
| --- | --- | --- | --- | --- |
| | | | Individual Amount | Cumulative Amount |
| 0 | | 200 | | |
| 30 | 1 | 130 | 1.41 | 1.41 |
| 60 | 2 | 137 | 1.47 | 2.88 |
| 90 | 3 | 137 | 1.30 | 4.18 |
| 120 | 4 | 137 | 1.17 | 5.35 |
| 150 | 5 | 143 | 1.06 | 6.41 |
| 180 | 6 | 145 | 0.90 | 7.31 |
| 210 | 7 | 0 | 0.75 | 8.06 |

The data in Table 4 confirm the conclusion drawn from Example 2, namely that separation and reuse of the catalyst phase results in increasing the product:$AlCl_3$ ratio. In Example 3 the yield of OHA-OHP is 11.1% based on 1,2,3,4-tetrahydronaphthalene.

The invention claimed is:

1. Method of preparing an octahydrotricyclic aromatic selected from the group consisting of octahydroanthracene and octahydrophenanthrene which comprises (1) contacting 1,2,3,4-tetrahydronaphthalene including hereinafter recited recycle 1,2,3,4-tetrahydronaphthalene at a temperature in the range of 0°–120° C. with a catalytically effective amonut of an aluminum halide-1,2,3,4-tetrahydronaphthalene-hydrogen halide complex catalyst, including hereinafter recited recycle catalyst, formed by contacting an aluminum halide selected from the group consisting of $AlCl_3$ and $AlBr_3$ with 1,2,3,4-tetrahydronaphthalene in the presence of a hydrogen halide, the halide in said hydrogen halide being the same as the halide in said aluminum halide, (2) settling the resulting two-phase system whereby there is obtained an upper organic layer containing said octahydrotricyclic aromatic and unreacted 1,2,3,4-tetrahydronaphthalene and a lower catalyst layer, (3) separating said organic layer from said catalyst layer, (4) recovering said octahydrotricyclic aromatic and 1,2,3,4-tetrahydronaphthalene from said organic layer, and (5) utilizing 1,2,3,4-tetrahydronaphthalene recovered in step (4) and catalyst separated in step (3) as said recycle 1,2,3,4-tetrahydronaphthalene and recycle catalyst respectively.

2. Method according to claim 1 wherein said aluminum halide is $AlCl_3$.

3. Method according to claim 1 wherein said aluminum halide is $AlBr_3$.

4. Method of preparing an octahydrotricyclic aromatic selected from the group consisting of octahydroanthracene and octahydrophenanthrene which comprises (1) contacting 1,2,3,4-tetrahydronaphthalene with an aluminum halide selected from the group consisting of $AlCl_3$ and $AlBr_3$ in the presence of a hydrogen halide, the halide in said hydrogen halide being the same as the halide in said aluminum halide, the amount of 1,2,3,4-tetrahydronaphthalene being more than about 5 moles and less than about 100 moles per mole of aluminum halide and said contacting being at a temperature in the range of 0°–120° C., whereby there is formed a two-phase system, one phase being an organic phase containing said octahydrotricyclic aromatic and unreacted 1,2,3,4-tetrahydronaphthalene, the other phase being an aluminum halide-tetralin-hydrogen halide complex catalyst phase, (2) separating said organic phase from said catalyst phase, (3) recovering said octahydrotricyclic aromatic and unreacted 1,2,3,4-tetrahydronaphthalene from said separated organic phase, and (4) contacting at a temperature in the range of 0°–120° C. 1,2,3,4-tetrahydronaphthalene recovered in step (3) with catalyst recovered in step (2), whereby additional octahydrotricyclic aromatic is formed.

5. Method according to claim 4 wherein said aluminum halide is $AlCl_3$.

6. Method according to claim 4 wherein said aluminum halide is $AlBr_3$.

7. Method according to claim 4 wherein said temperature is in the range of 25°–80° C.

8. Method according to claim 4 wherein the recovered 1,2,3,4-tetrahydronaphthalene and recovered catalyst used in step (4) are mixed with fresh 1,2,3,4-tetrahydronaphthalene and fresh $AlCl_3$ respectively prior to the contacting of step (4).

9. Method according to claim 4 wherein the contacting of step (1) is for 5–60 minutes.

10. Method of preparing an octahydrotricyclic aromatic selected from the group consisting of octahydroanthracene and octahydrophenanthrene which comprises (1) contacting 1,2,3,4-tetrahydronaphthalene at a temperature in the range of 0°–120° C. with a catalytically effective amount of an aluminum halide-1,2,3,4-tetrahydronaphthalene-hydrogen halide complex catalyst formed by contacting an aluminum halide selected from the group consisting of $AlCl_3$ and $AlBr_3$ with 1,2,3,4-tetrahydronaphthalene in the presence of a hydrogen halide, the halide in said hydrogen halide being the same as the halide in said aluminum halide, (2) settling the resulting two-phase system whereby there is obtained an upper organic layer containing said octahydrotricyclic aromatic and unreacted 1,2,3,4-tetrahydronaphthalene and a lower catalyst layer, (3) separating said organic layer from said catalyst layer, and (4) recovering said octahydrotricyclic aromatic from said organic layer.

No references cited.

DELBERT E. GANTZ, *Primary Examiner.*

C. R. DAVIS, *Assistant Examiner.*